United States Patent [19]

Sakai et al.

[11] Patent Number: 4,619,720
[45] Date of Patent: Oct. 28, 1986

[54] MAGNETIC AMORPHOUS ALLOYS COMPRISING CO, FE, ZR, AND NB

[75] Inventors: Ikuo Sakai, Sagamihara; Hiroyasu Karimoto, Tokyo; Yasuhiko Nakayama, Kawasaki, all of Japan

[73] Assignee: Matsushita Electric Industrial Co., Ltd., Japan

[21] Appl. No.: 647,185

[22] Filed: Sep. 4, 1984

[30] Foreign Application Priority Data

Sep. 1, 1983 [JP] Japan .................................. 58-161357

[51] Int. Cl.$^4$ .............................................. C22C 19/07
[52] U.S. Cl. ..................................... 148/403; 420/435; 148/31.55
[58] Field of Search ............. 420/435; 148/403, 31.55, 148/31.57, 100, 101

[56] References Cited

U.S. PATENT DOCUMENTS

| | | | |
|---|---|---|---|
| 3,390,443 | 7/1968 | Gould et al. | 148/31.55 |
| 3,600,162 | 8/1971 | Kaplan | 148/31.55 |
| 3,983,916 | 10/1976 | Henmi et al. | 148/120 |
| 3,989,557 | 11/1976 | Henmi et al. | 148/120 |
| 4,155,144 | 5/1979 | Hasegawa et al. | 148/403 |
| 4,188,211 | 2/1980 | Yamaguchi et al. | 148/403 |
| 4,306,908 | 12/1981 | Takayama et al. | 148/31.57 |
| 4,318,738 | 3/1982 | Masumoto et al. | 148/403 |

Primary Examiner—Christopher W. Brody
Attorney, Agent, or Firm—Lowe, Price, LeBlanc, Becker & Shur

[57] ABSTRACT

A magnetic amorphous alloy having a compositional formula $$(Co_{100-y}Fe_y)_{100-x}Zr_{100-w}Nb_w)_x$$

in which $5 \leq x \leq 10$, $0.5 \leq y \leq 4$, and $20 \leq w \leq 90$.

3 Claims, 3 Drawing Figures

MAGNETIC AMORPHOUS ALLOYS COMPRISING CO, FE, ZR, AND NB

BACKGROUND OF THE INVENTION

1. Field of the Invention

This invention relates to magnetic recording and more particularly, to magnetic amorphous alloys having particular utility in the field of magnetic recording and having a high magnetic flux density.

2. Description of the Prior Art

In the field of magnetic recording, there is a recent trend toward high density recording, for which magnetic recording mediums having high coercive force have been manufactured. Recording heads for the high density recording should have magnetic cores made of materials which satisfy a number of characteristic requirements. For instance, the core materials should have a high saturation magnetic flux density, Bs, a small coercive force, Hc, a high magnetic permeability, $\mu$, good stability in magnetic characteristics against external stress, good resistances to abrasion, corrosion and heat, and easy processing. One of typical high density recording systems is a vertical magnetic recording system. In the vertical magnetic recording system, Co-Cr alloys have been usually used as a magnetic layer of a vertical magnetic medium. Such alloys have usually a saturation magnetic flux density, Bs, of about 6000 gausses. In order to record information signal on the medium having such a level of Bs as mentioned above, a core material for the recording head should have a saturation magnetic flux density, Bs, as high as 10,000 gausses or higher. However, hitherto known magnetic materials do not satisfy all the characteristic requirements mentioned above. For instance, Permalloy materials are unsatisfactory because their saturation magnetic flux density is as low as 7000–8000 gausses. With metal-metalloid alloys such as amorphous Co-Fe-Si-B alloys, they have a satisfactorily high saturation magnetic flux density, Bs, but are thermally unstable, thus leading to the disadvantage that magnetic characteristics vary largely as a function of time.

SUMMARY OF THE INVENTION

It is accordingly an object of the invention to provide magnetic amorphous alloys which have particular utility in the field of high density recording and exhibit good magnetic characteristics including a high saturation magnetic flux density over about 10,000 gausses.

It is another object of the invention to provide magnetic amorphous alloys which are small in magnetostriction and exhibit good resistances to abrasion or wear, corrosion and heat and easy processing.

The present invention is characterized by a magnetic alloy which is amorphous in nature and which consists essentially of cobalt (Co), iron (Fe), zirconium (Zr) and niobium (Nb). Such amorphous alloys have a saturation magnetic flux density not less than 10,000 gausses. More particularly, the magnetic amorphous alloys of the invention have a composition of the following formula $(Co_{100-y}Fe_y)_{100-x}(Zr_{100-w}Nb_w)_x$ in which $5 \leq x \leq 10$, $0.5 \leq y \leq 4$ and $20 \leq w \leq 90$.

DETAILED DESCRIPTION AND PREFERRED EMBODIMENTS OF THE INVENTION

As is well known in the art, amorphous alloys can be prepared by various techniques. For instance, metal components having predetermined ratios are subjected to RF sputtering under conditions sufficient to give amorphous alloys. An RF sputtering apparatus is typically operated under conditions of an Ar gas pressure of $5 \times 10^{-3}$ Torr., an ultimate vacuum of $5 \times 10^{-7}$ Torr., a power supply of 200 W, and a substrate temperature of from 70° to 130° C. Under these conditions, amorphous alloys of the present invention can be suitably prepared on a substrate such as a glass plate.

Figure 1:
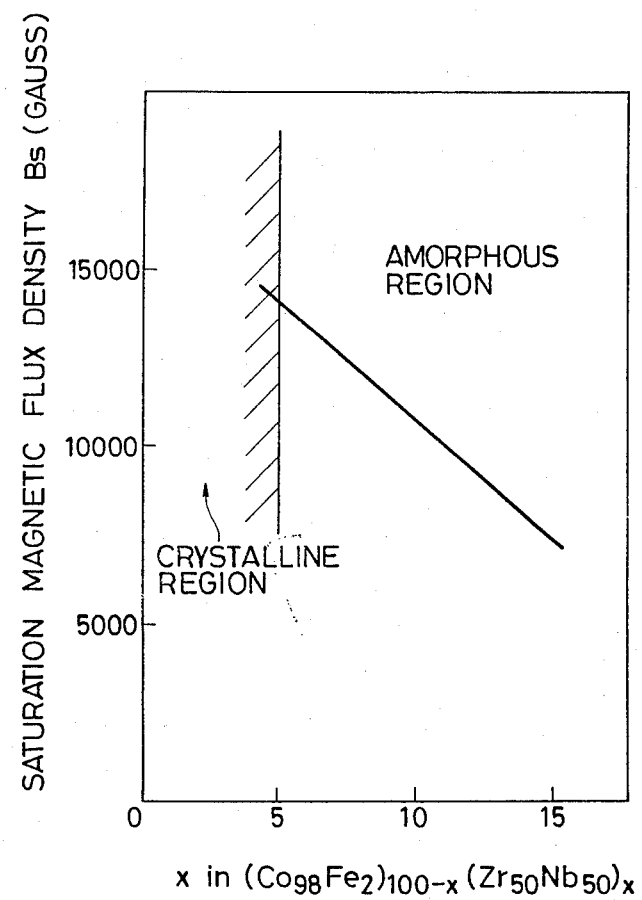
FIG. 1 is a graphical representation of the relation between saturation magnetic flux density and x in an alloy having the formula, $(Co_{98}Fe_2)_{100-x}(Zr_{50}Nb_{50})_x$, according to one embodiment of the invention.

Alloys having the compositional formula, $(Co_{98}Fe_2)_{100-x}(Zr_{50}Nb_{50})_x$, are prepared by sputtering under conditions indicated above while changing the value, x, from 5 to 20. The resulting alloys are subjected to measurement of a saturation magnetic flux density, Bs, in relation to variation in x. The results are shown in FIG. 1. From the figure, it will be seen that the magnetic flux density decreases linearly with an increase of x. When x reaches about 10, the density, Bs, takes a value of 10,000 gausses. On the other hand, in the hatched region of the figure where x is below 5, crystallization takes place with extreme deterioration of soft magnetic characteristics. The relation between the saturation magnetic flux density, Bs, and x is experimentally confirmed to be independent of the ratio between Zr and Nb and to be almost independent of the amount of Fe in the range where the ratio of Fe is below 10. In other words, if the ratio between Zr and Nb and the amount of Fe are changed within the above-indicated ranges, similar results as shown in FIG. 1 are obtained. From the above, it will be seen that in order to obtain amorphous alloys of the four-components system which have a saturation magnetic flux density, Bs, over 10,000 gausses and are thus suitable as a magnetic core material for vertical magnetic recording, x should range from 5 to 10.

Figure 2:
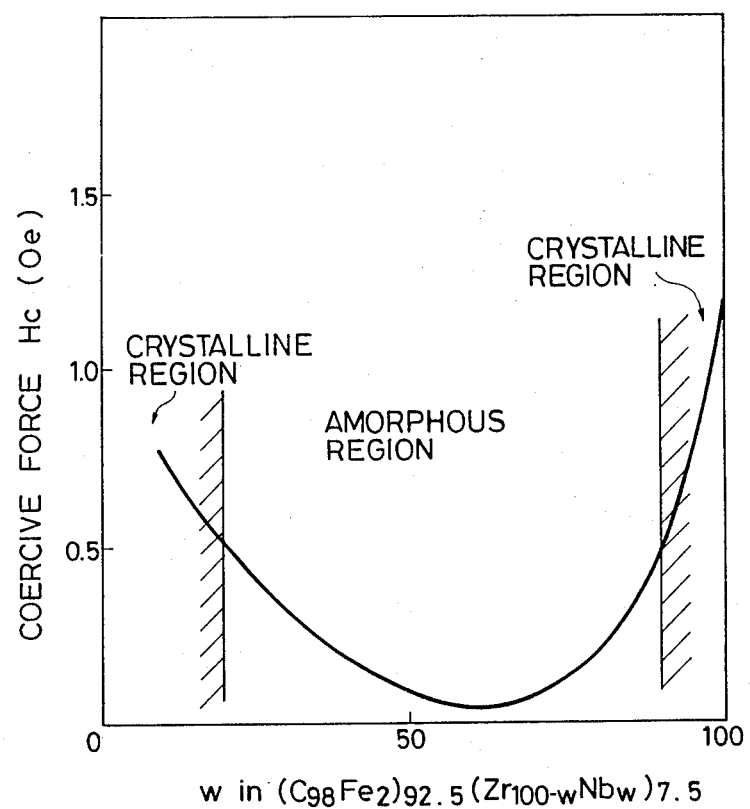
FIG. 2 is a graphical representation of the relation between coercive force and w in an alloy of the invention having the formula, $(Co_{98}Fe_2)_{92.5}(Zr_{100-w}Nb_w)_{7.5}$.

FIG. 2 show a coercive force, Hc, as a function of w for an alloy having the formula, $(Co_{98}Fe_2)_{92.5}(Zr_{100-w}Nb_w)_{7.5}$ in which w is varied in the range from 10 to 100. With soft magnetic materials, they are considered to have better characteristics when magnetic permeability is higher and coercive force is smaller. As will be seen from FIG. 2, the coercive force, Hc, becomes minimal when w is 60. However, when w is smaller than 20 and exceeds 90, crystallization takes place, with the result that the coercive force, Hc, undesirably increases. Thus, the range of w is found to be between 20 and 90. Within such a range of w, the saturation magnetic flux density, Bs, is kept constant at about 12,000 gausses.

In the magnetic amorphous alloys of the invention, Co is used as a primary component along with the other metal components rendering the alloy amorphous, e.g. Nb, Zr and Fe. Co-Zr has a positive magnetostriction, Co-Nb has a negative magnetostriction, and Co-Fe in which the content of Fe is below 10 has a negative magnetostriction. The positive and negative magnetostrictions are offset by each other and a magnetic permeability as high as 10,000 or larger can be obtained.

Figure 3:
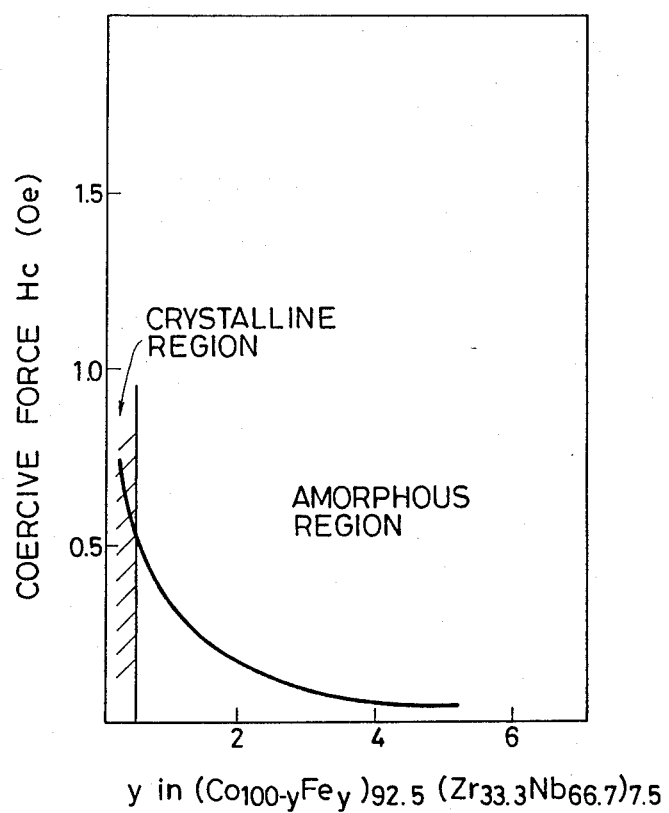
FIG. 3 is a graphical representation of the relation between coercive force and y in an alloy of the invention having the formula, $(Co_{100-y}Fe_y)_{92.5}(Zr_{33.3}Nb_{66.7})_5$.

FIG. 3 shows a coercive force, Hc, as a function of y for an alloy having the compositional formula, $(Co_{100-y}Fe_y)_{92.5}(Zr_{33.3}Nb_{66.7})_{7.5}$ in which y is varied from 0.5 to 5. When y is smaller than 0.5, crystallization occurs with the coercive force becoming too large. However, when y is 0.5 or more, the resulting alloy becomes amorphous in nature with a small value of Hc. However, when y exceeds 4, the balance of the positive and negative magnetostrictions is lost with too large a magnetostriction. As a result, the magnetic permeability, $\mu$, lowers to below 5000 and thus satisfactory magnetic characteristics cannot be obtained. In order to satisfy the requirement that the permeability is high and the coercive force is low, y should be within a range of from 0.5 to 4.

Gathering the foregoing, magnetic amorphous alloys of the invention which has a saturation magnetic flux density of 10,000 gausses or higher, a high magnetic permeability and a low coercive force are represented by the following formula $$(Co_{100-y}Fe_y)_{100-x}(Zr_{100-w}Nb_w)_x$$

in which $5 \leq x \leq 10$, $0.5 \leq y \leq 4$ and $20 \leq w \leq 90$. The crystallization temperature of the alloy is over 450° C. as will not be experienced in known amorphous metal-metalloid alloys. Thus, the alloys of the invention exhibit high thermal stability.

Moreover, the elements incorporated to render the alloy amorphous are metals, so that the alloys exhibit good resistances to abrasion and corrosion and have a high saturation magnetic flux density.

What is claimed is:

1. A magnetic amorphous alloy having a compositional formula $$(Co_{100-y}Fe_y)_{100-x}(Zr_{100-w}Nb_w)_x$$

in which $5 \leq x \leq 10$, $0.5 \leq y \leq 4$, and $20 \leq w \leq 90$.

2. The magnetic amorphous alloy according to claim 1, wherein said alloy is prepared by sputtering.

3. The magnetic amorphous alloy according to claim 1, wherein said alloy has a crystallization temperature not lower than 450° C. and a saturation magnetic flux density not lower than 10,000 gausses.

* * * * *